Figure 1:
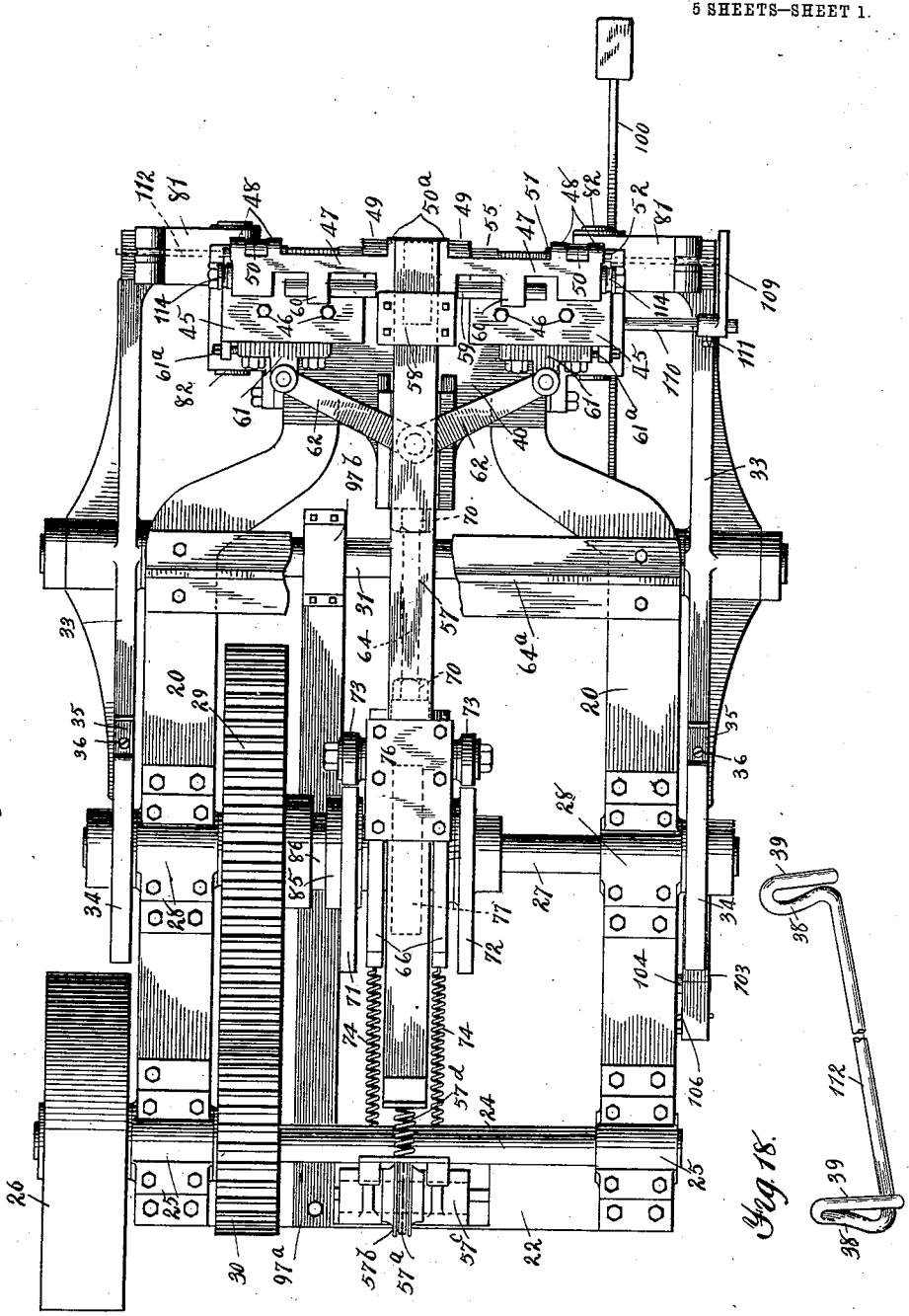

E. McCARTHY.
CHAIN LINK BENDING MACHINE.
APPLICATION FILED OCT. 21, 1910.

1,011,829.

Patented Dec. 12, 1911.

5 SHEETS—SHEET 1.

E. McCARTHY.
CHAIN LINK BENDING MACHINE.
APPLICATION FILED OCT. 21, 1910.

1,011,829.

Patented Dec. 12, 1911.
5 SHEETS—SHEET 2.

E. McCARTHY.
CHAIN LINK BENDING MACHINE.
APPLICATION FILED OCT. 21, 1910.

1,011,829.

Patented Dec. 12, 1911.

5 SHEETS—SHEET 3.

Witnesses:
C. F. Bassett
M. A. Milord

Inventor
Emmet McCarthy
By Frederick Benjamin
Atty.

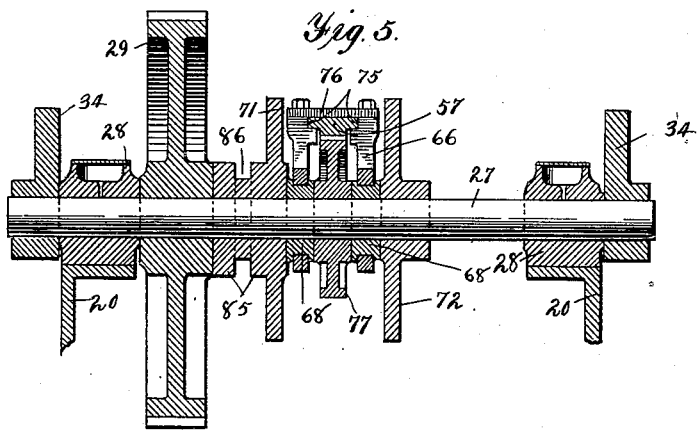
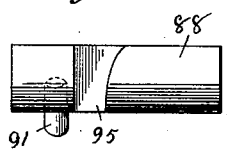
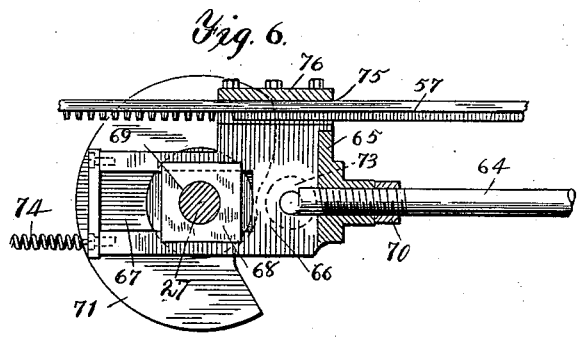
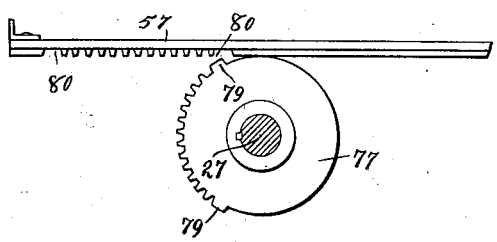
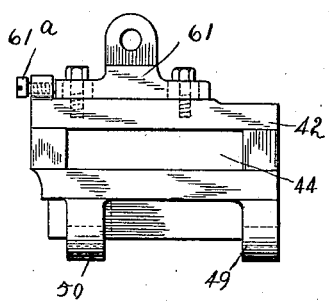
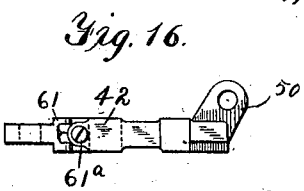

E. McCARTHY.
CHAIN LINK BENDING MACHINE.
APPLICATION FILED OCT. 21, 1910.
1,011,829.
Patented Dec. 12, 1911.
5 SHEETS—SHEET 5.
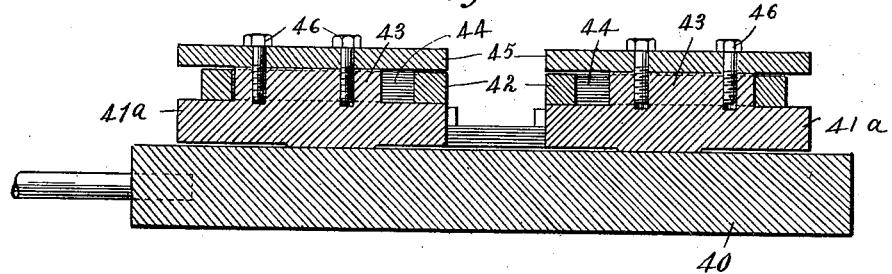
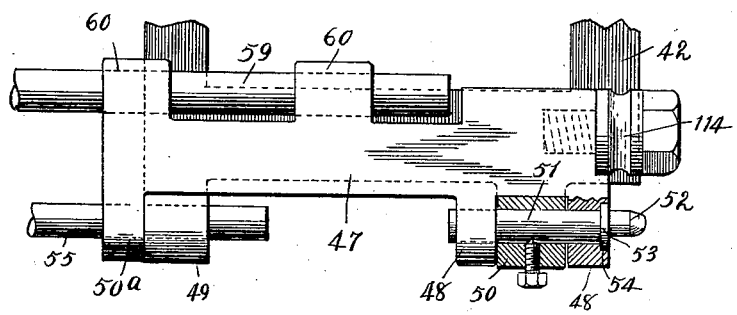
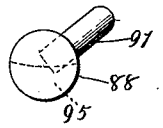
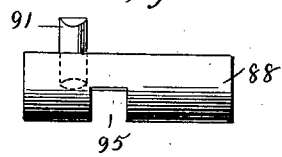
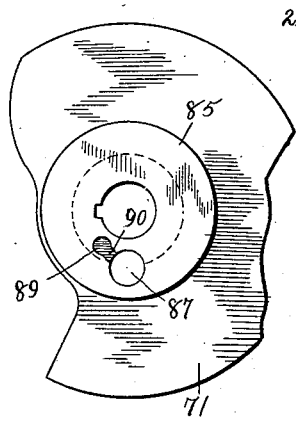
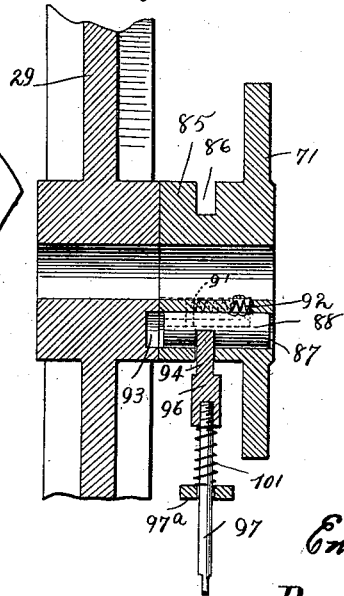
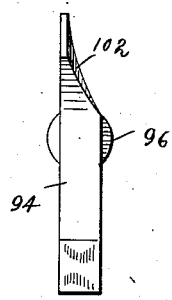

UNITED STATES PATENT OFFICE.

EMMET McCARTHY, OF CHICAGO, ILLINOIS, ASSIGNOR TO DOWDEN MANUFACTURING COMPANY, OF PRAIRIE CITY, IOWA, A CORPORATION OF IOWA.

CHAIN-LINK-BENDING MACHINE.

1,011,829.   Specification of Letters Patent.   Patented Dec. 12, 1911.

Application filed October 21, 1910. Serial No. 588,264.

*To all whom it may concern:*

Be it known that I, EMMET McCARTHY, citizen of the United States, residing at Chicago, in the county of Cook and State of Illinois, have invented certain new and useful Improvements in Chain-Link-Bending Machines, of which the following is a specification.

My invention relates to rod bending machines, and has particular reference to apparatus designed to form rods by a bending process into shapes so designed as to adapt the bent pieces to be linked together or interlocked to form a flexible chain or conveyer that will be especially suitable for use in implements employed for digging potatoes.

The chief objects of the improvements which constitute the subject matter of this application for patent are:—to provide a simple machine for the purpose stated in which the working parts are designed so that they will have unusual strength, thus rendering the machine capable of withstanding the severe strain to which it is necessarily subjected; to furnish means for relieving the shock of the operative movement or the recoil in the heavier reciprocating parts, and to produce a machine that may be run at a comparatively high speed with the result of increasing the output for a given period of time.

Other objects of this invention are to furnish means for adjusting various parts of the apparatus to compensate for wear or to vary the shape of the finished product; to provide devices for reducing the friction between contacting parts, and to arrange certain of the coöperating members in such a relation as to leverage, that the application of the power will be made to the best possible advantage.

Further objects are to provide the drive pulley and main gears with comparatively heavy rims, so that they will have a governing function by regulating the rotary movement of the shafts after the manner of a fly wheel; to furnish an adjustable stop or guide to aid in properly placing the rod to be bent in operative position in the machine, and to arrange a simple durable and quick acting clutch between the drive shaft and the rest of the mechanism, so designed that when thrown into or out of operative position the movement will be smooth and even, thus permitting a comparatively high speed with a corresponding increase in the general efficiency, and prolonging the life of the machine, by relieving the moving parts from undue shock.

I accomplish the above mentioned results and others of practical advantage by the employment of the apparatus illustrated in the accompanying drawings, which form a part of this application.

The machine is shown operatively assembled and in addition the important details of construction are disclosed in various fragmentary and sectional views designated as follows:—

Figure 2:
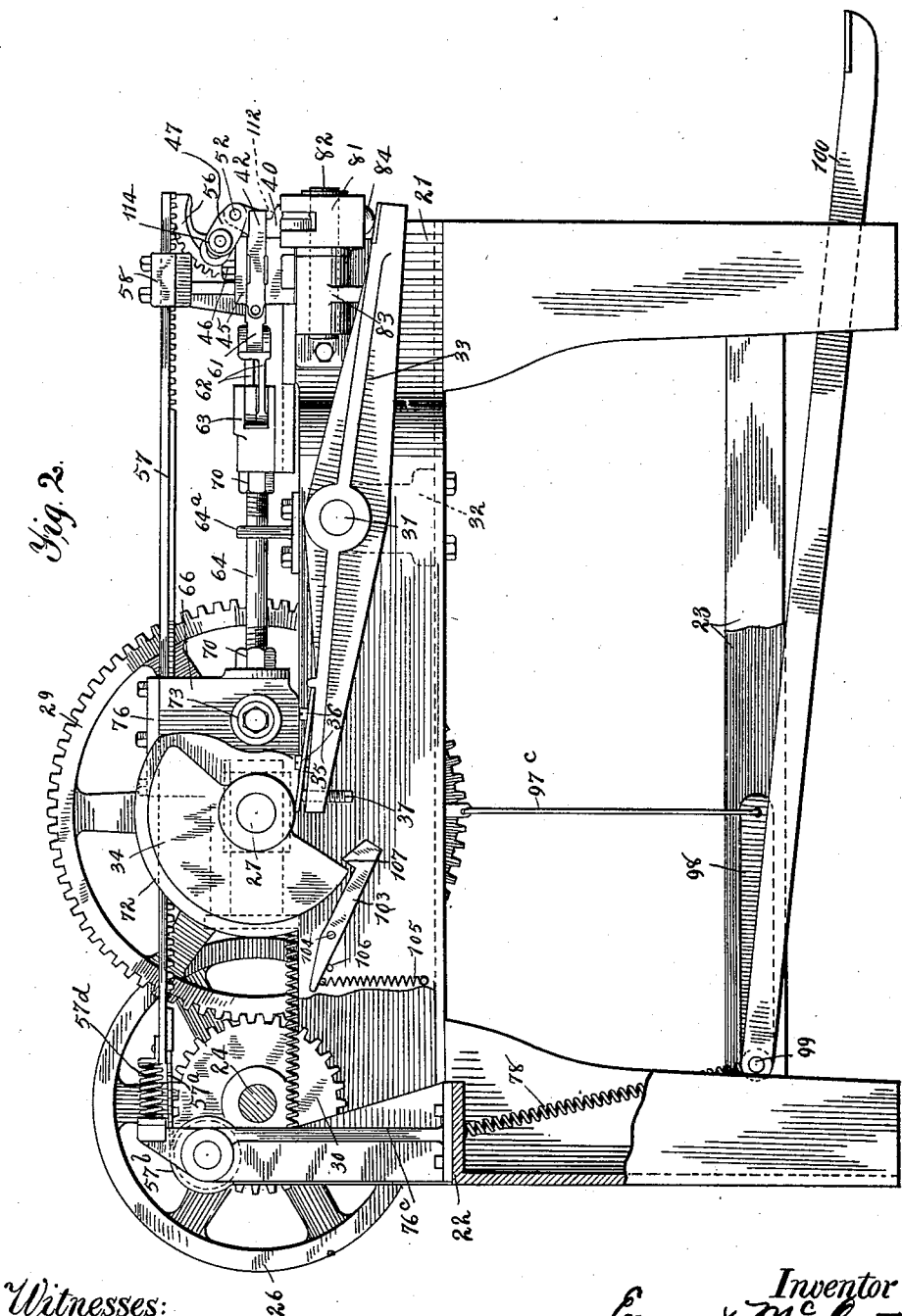
Figure 3:
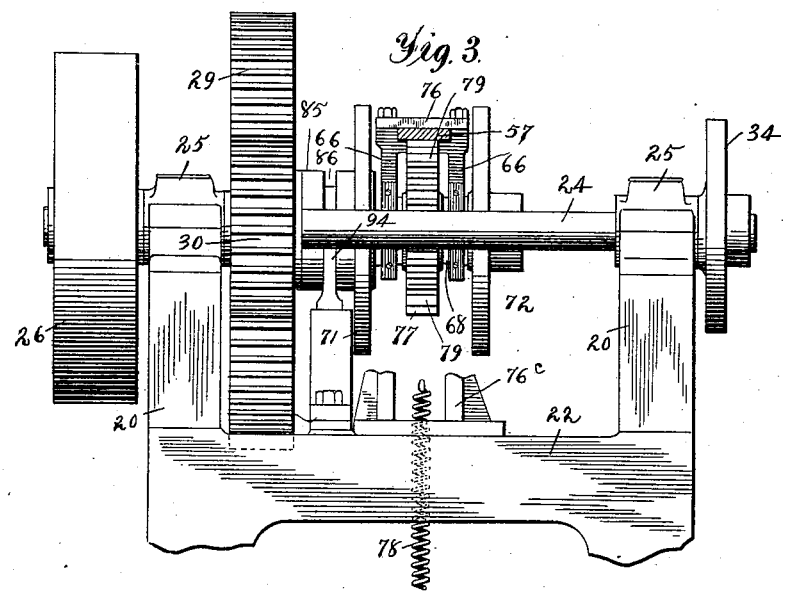
Figure 4:
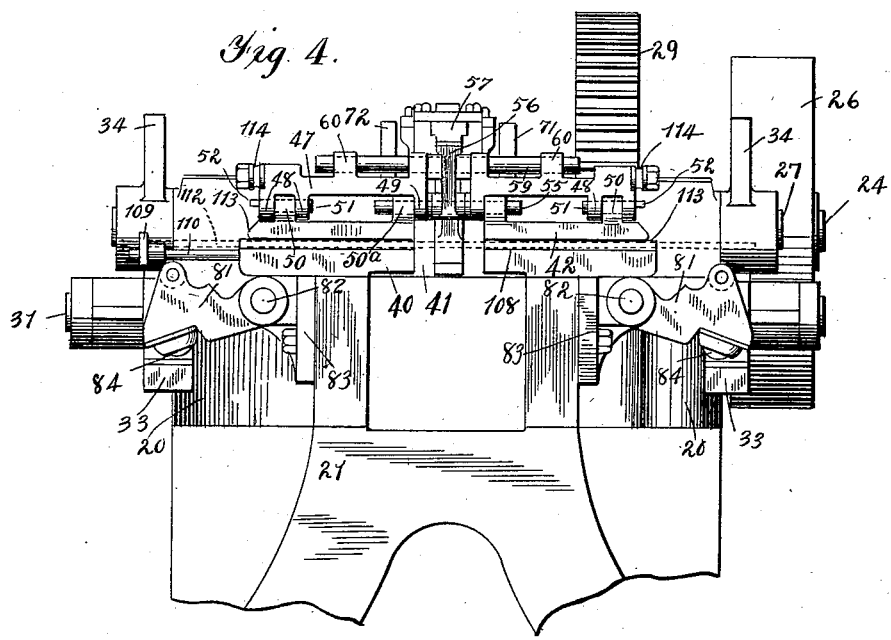

Figure 1 is a top plan view; Fig. 2 is a side elevation, the structure being viewed from the left; Fig. 3 is a rear elevation, with some of the parts broken away and others removed; Fig. 4 is a front elevation of the machine; Fig. 5 is a partial view showing in section the main cam shaft and mechanism mounted thereon; Fig. 6 is a fragmentary view showing a portion of the operating mechanism for the slidable forming plate for the purpose of disclosing the manner of supporting the slide frame upon the main cam shaft; Fig. 7 is a top plan view of the slidable forming plate; Fig. 8 is a view showing a portion of the rack for operating the rock bar, and the segmental driving gear therefor; Fig. 9 is a sectional view showing the manner of supporting the slidable forming members; Fig. 10 is a top plan view of the rock bar upon one side, one of the hinge knuckles being in section to clearly show the manner of mounting the link forming pin; Fig. 11 is a sectional view of the clutch mechanism; Fig. 12 is a side elevation of the cam bearing clutch member; Figs. 13 and 14 are an end and a side elevation respectively, of the clutch pin; Fig. 15 is a top plan view of the clutch pin operating yoke; Fig. 16 is an end elevation of the slide plate shown in Fig. 7; Fig. 17 is a view of the clutch pin seen from the under side; Fig. 18 is a perspective view of a completed chain-link.

Referring to the details of the drawings, the numeral 20 indicates a rectangular frame forming the bed of the machine, supported at the front and rear by frame standards 21, 22, which are braced by connecting rails 23. Upon the rear end of the said bed frame is mounted a drive shaft 24, extending transversely of the frame and journaled in boxes 25. One end of this shaft projects beyond its bearing, and carries a driving pulley 26, which is made with an unusually heavy rim, so that it may perform the function of a fly wheel as previously mentioned. Mounted parallel with the drive shaft is a countershaft 27, journaled in bearings 28, which are carried upon the bed frame 20. This countershaft bears a loose gear wheel 29, which is mounted just inside the frame, and receives motion from an intermeshing pinion 30, keyed on the drive shaft 24. Located about midway between the said countershaft and the front of the machine, and upon a lower plane than the previously mentioned shafts, is a rock-shaft 31, the ends of which project through, and are journaled in the side members of the bed frame, an additional support in the form of a block or bracket 32 being arranged in the median line of the frame. The projecting ends of said rock-shaft carry rock arms or levers 33, which extend upon both sides of the said shaft. These rock-levers are operated by cam-disks 34, mounted upon the ends of the counter-shaft 27, which project beyond their boxes for this purpose. The rear end of each rock-lever projects into the path of its respective cam, and is furnished with an adjustable contact plate 35, secured to the upper face of the lever by screws 36, the rear end being engaged by an adjusting screw 37 which passes upward through a threaded hole in the lever to engage the under side of the said plate 35. To adjust the plate, the screws 36 are first loosened and the adjusting screw 37 then turned to give the required throw to the lever, after which the plate is again secured by the screws 36.

The purpose of the machine, as previously stated, is to bend the ends of a rod of a given length into hooks of a special form to form a chain link or member of the shape shown in Fig. 18, and the devices which engage and hold the said rod while it is being formed and the mechanism which bends the rod into the required shape will now be described.

In order to produce the compound curves illustrated in said Fig. 18, two distinct bending operations are required; first, the ends of the rod are bent upwardly at approximately right angles with the main portion of the rod, such upturned parts being indicated at 38; second, the outer portion of each part 38 is bent forward and downward forming the hook portion 39. Upon the front of the bed frame 20 is arranged a horizontal frame plate 40, cut out in the middle of its front margin, leaving a space or recess 41 (Fig. 4) to accommodate mechanism which will be presently described. Upon this frame plate are fixed bed plates 41ᵃ which support two forming members or slide plates 42, (Fig. 9) adapted to move transversely to the main frame, and held in alinement by a pair of rectangular blocks or lugs 43 integral with said bed plates, which enter similarly shaped apertures 44 in the said slide plates. The plates 42 are held in position by caps 45, which rest on the blocks 43 and are secured by screws 46. Each slide plate 42 carries a rock-bar 47 (Fig. 10) provided with ears or knuckles 48, 50ᵃ, which coöperate with similar knuckles 50, 49, on the slide plate to form hinges. There are two of the knuckles 48 at one end of the bar, 47, separated by a sufficient interval to receive the corresponding knuckle 50 of the plate 42, and the hinge thus formed is provided with a pin or pintle 51, which, in addition to its function as a pivot for the hinge, has another office, which is performed by a projecting end 52 of the pintle, adapted to form a fulcrum around which the end of the rod to be shaped is turned to make one of the bends. The said pin or pintle 51 has a collar 53, which is let into a counterbore 54 in the outside knuckle 48, and the projecting end or point 52 is decentered, forming an eccentric, so that, by turning the pintle in its bearings, the position of the point 52 may be adjusted about the axis of the pin of which it forms a part, and relatively to the coöperating rod-forming elements. The pintle 51 is secured in said adjusted position by a set screw, which engages a threaded hole in the knuckle 50. By this means the bends formed in the opposite ends of the rod may be made exactly alike, so that when the shaped rods are linked together to form a conveyer chain, there will be no appreciable variation in the lengths of the opposite sides of the said chain when assembled. The inner hinges formed by the knuckles 49, 50ᵃ, are supplied with a common pintle or rod 55 which extends across the recess 41 and is loosely fitted in said knuckles, so that the latter may slide longitudinally as well as rotate thereon. Mounted fast upon this pintle or rod 55 is a sector gear 56 (Fig. 2) meshing with and receiving motion from a rack bar 57, which extends to the rear of the main frame, being slidably supported near the front end in a bracket 58 extending upward from the frame plate 40. The said gear 56 is adapted to rock the bars 47 by means of a lever consisting of a shaft or rod 59 which passes through a hole in the web of the said gear and is keyed fast therein, while its ends project upon each side and are fitted to slide, and also to rotate, in ears or lugs 60 attached to the rock-bars 47. It will be understood that when the gear 56 is turned or rocked in its bearings, the said lever 59 will move bodily therewith about the axis of said gear and rock both bars 47 upon their hinges.

The slide plates 42 are reciprocated by mechanisms connected with the counter-shaft 27 constructed as follows:—Attached to the rear of each plate 42 is a bracket 61, secured by bolts which pass through slots to permit adjustment by screws 61ᵃ (Figs. 1 and 7) and pivoted to these brackets are links or levers 62, which meet in the median line and are pivoted at a common point to a connection 63, slidable on the frame-plate 40 in a direction longitudinal to the main frame. The links 62 thus constitute a compound or toggle-jointed lever, connected by a rod 64 with a slide frame supported upon the counter-shaft 27 and transverse beam 64ᵃ forming a bearing for the rod. The said frame comprises a rectangular body portion having a front wall or plate 65 (Fig. 6) and two lateral walls 66, the remaining sides being open. The lateral walls are reduced in height toward the rear and are provided with longitudinal slots 67, in which are slidably fitted blocks or boxes 68, having holes 69 through which the said counter-shaft 27 passes. The said rod 64 has right and left hand threads at each end to facilitate adjustment and is furnished with jam nuts 70, to secure the connections in adjusted position. The slide frame is operated by two disk cams 71, 72, (Fig. 1) mounted upon the counter-shaft 27 outside of, and adjacent to the said boxes 68. Rollers 73 are mounted upon each side of the body of the slide frame and are arranged in the path of the respective disk cams, so that when the counter-shaft is rotated the cams 71, 72, will engage the said rollers 73 and move the slide-frame forward, this movement, through the action of the toggle jointed levers 62 causing the slide plates 42 to move apart. As the action of the cams 71, 72, is to move the slide frame forward only, in order to return the frame and attachments to their initial positions, I provide springs 74 which connect the rear ends of the sides of the slide frame with a fixed point on the main frame. The rack bar 57, previously mentioned, is supported in grooves 75, Fig. 5, formed by rabbeting the side walls of the body of the slide frame and completing the grooves by means of a cover plate 76. The said rack bar is operated in one direction by a segmental gear 77 (Figs. 5 and 8) which is keyed fast on the countershaft 27 in the median line between the said boxes 68. This gear is provided with a sufficient number of teeth to cause the proper throw to the rack bar 57, which, in turn, actuates the sector gear 56, giving it an oscillating rotary or rocking motion. When the countershaft 27 rotates, the segmental gear 77 mounted thereon will carry the rack-bar 57 with it until the point is reached where the gear will become disengaged from the rack, and the latter will be returned to its initial position by the action of a coiled spring 78, attached by a chain 57ᵃ (Fig. 1) to the rear end of the bar. This chain passes over a suitable pulley 57ᵇ mounted on a bracket frame 57ᶜ carried by the rear frame standard 22. A buffer spring 57ᵈ is interposed between the rear end of the rack 57 and the upper end of the bracket 57ᶜ to reduce the shock of the return movement of said bar. The gear 77 when it leaves the rack will continue to rotate until it has made one complete revolution, or until the counter-shaft has been automatically thrown out of gear by means to be described, thus leaving the coöperating mechanism in initial position. The parts operated by the said gear 77 being comparatively heavy, the power required to move them when performing work makes it necessary to reinforce some of the teeth in the gear 77 to prevent their being broken by the force of the impact when thrown into gear with the rack bar 57. This is done by making the first and last teeth of the segment double, as shown at 79, (Fig. 8) and the rack 57 with which the gear meshes is adapted to accommodate said double teeth by omitting a tooth at the proper points so as to leave spaces 80 for the said double or reinforced teeth to enter.

The forward ends of the rock levers 33 project beneath the outer ends of rock arms 81 which extend at right angles to said levers and are mounted on rock-shafts 82, journaled in brackets 83. The said arms 81 are not attached to the levers 33, but simply rest thereon by their own weight. To lessen the friction at the points of contact between these members, a spherical bearing 84 is mounted on the under face of each arm 81, the details of the bearing not being shown, since devices of this character are in common use as casters in trucks and other similar heavy articles, and their construction is well understood.

During the operation of the machine, the drive shaft 24 and the loose gear 29 are given a continuous motion, while the counter-shaft 27 has an intermittent movement, being thrown into and out of gear as required by means of a clutch arranged as follows:—The disk cam 71, mounted on the counter-shaft adjacent to the gear 29, is provided with a hub 85 (Figs. 11, 12) which has a comparatively deep peripheral groove 86. A hole 87 is bored through the said hub parallel with its shaft, and in this hole is slidably mounted a clutch pin 88, the position of the hole 87 being such that the said pin passes laterally through said groove 86. Arranged parallel with said hole 87 is a smaller hole 89, which opens on the end of the hub next to the gear, but does not extend entirely through the hub. The holes 87 and 89 are connected by a slot 90, which is co-extensive with the shorter hole 89.

The pin 88 is provided with a laterally projecting lug or finger 91, which projects through the slot 90 into the bore 89, where it is engaged by a coiled spring 92, which tends to hold the pin 88 in an extended position. The face of the gear hub adjacent the cam hub 85 is furnished with a notch or socket 93 adapted to be operatively engaged by the pin 88 when the latter is extended by the action of its spring 92. The said pin 88 is normally held in a retracted position by means of a yoke 94, which is curved to fit the contour of the groove 86 in which it is arranged, and normally engages a notch 95 in the side of the said pin. The yoke 94 has a stem 96, to which is attached a rod 97 extending downward and passing through a flat bar 97ª fastened to the frame at the rear end and having its forward end hung to the counter shaft 27 by a bearing 97ᵇ (Fig. 1). The rod 97 is connected by a link 97ᶜ to a rock arm 98 mounted on a rock shaft 99 journaled in the frame members 23. The rock-shaft is operated by a clutch operating treadle 100, which is fixed on said shaft 99 at its rear end and extends beyond the frame at the front of the machine. The yoke 94 is restored to its initial position by a spring 101, and the forward end of the yoke is beveled as indicated at 102, so that it will readily reënter the notch 95 as the counter-shaft revolves after the clutch pin has been released.

Inspection of the drawings will disclose the fact that when at rest on the shaft 27 the cams are necessarily arranged so that there will be a preponderance of weight upon the rear side of the said shaft, and by reason of this overbalancing the vibration of the machinery will tend to cause a slight backward movement of the rotating parts after they come to a stop at the end of each complete revolution, and this would in time interfere with the proper working of the machine. To prevent this back movement I provide a detent device comprising a dog 103 (Fig. 1) pivoted at 104 to the outer side of the frame and having a spring 105 which holds the dog against a stop 106. The front end of the dog is provided with a tooth 107 which is thus yieldingly maintained in the path of the cam 34, and will engage the latter to prevent retrograde movement, as plainly shown in Fig. 2.

The operation of the machine is as follows:—The pulley 26 having been connected with any available source of power the drive shaft and gears 29, 30, will have a continuous motion while the remaining mechanisms are intermittently at rest in their normal or initial positions, shown in the drawing in the assembled views. The rods that are to be formed are first cut to the required length and have their ends heated to facilitate bending. The operator stands at the front of the machine and seizing a rod with a pair of tongs, places it in a groove 108, Fig. 4, formed by chamfering the upper angle of the frame plate 40, bringing the left hand end of the rod against a stop or guide 109, slidably supported on an arm 110 attached to the frame, and secured in adjusted position by a set screw 111 (Fig. 1). The position of a rod placed in the groove as above described is shown in dotted outlines 112. The rod being in proper position, the operator depresses the treadle 100 which immediately releases the clutch pin 88 and the latter is thrown by its spring 92 into engagement with the socket 93, thus actuating the countershaft 27. The first action of the mechanism will be to move the slide frame forward by means of the cams 71, 72, thus separating the slide plates 42 by the action of the toggle jointed levers, and projecting the points or ends 52 of the pintles 51, into the path taken by the end of the rod during the production of the second bend hereinafter described. When the slide plates have been extended they are held in this position by their cams 71, 72, while the cams 34 upon the outer ends of the countershaft operate the rock levers 33 to move each rock-arm 81 upward carrying the end of the rod to a vertical position against the end of the slide bar which is rounded as indicated at 113 to give the proper shape to the bend. The part 38 of the rod now projects nearly vertically upward behind the point 52 of the pintle 51. The next step is the bending of the extremity of the said part 38 forward and downward upon the point 52. This is accomplished by the forward rocking movement of the bars 47 which are supplied with anti-friction rollers 114 adapted to engage the ends of the rods and carry them against the points 52 and as said points are at the center of the rock bar movement the result will be to give a symmetrical curve to the hook. In operating the treadle it is given a quick downward movement sufficient to free the clutch pin, and then immediately released allowing the yoke to rise until it strikes against the bottom of the groove 86, upon which it rides, and as the yoke will thus be in the path of the pin as the latter travels bodily around the shaft axis, the tapering end of the yoke will enter the notch in the pin and force it back to its initial or retracted position, thus releasing the clutch, and stopping the mechanism controlled thereby. Thus each treadle movement will cause a single revolution of the countershaft 27. The rock bars will be held in extended position until the second bend has been completed. At this point the rack bar 57 will be released and the action of the spring 78 will throw the sector gear and connected rock bars back to their initial positions, and practically simultaneously therewith the cams 71, 72, will clear the rollers 73 and the springs 74 restore the sliding frame to its normal position, retracting the plates 42, and bars 47, so that the pins 52 will be removed from engagement with the bent rod permitting the latter to be removed so that another straight rod may be substituted therefor and the operation above described repeated to form the second rod and thus a completed link is formed at each revolution of the countershaft, so long as the blank rods are properly fed to the forming mechanism.

Having thus described my invention what I claim as new is:—

1. In a rod bending machine, the combination with the frame, a drive shaft, a counter-shaft, means for intermittently operating the said countershaft, a rock-shaft, operative connection between said counter-shaft and the rock-shaft, slide bars adapted to be moved transversely to the said frame, and rock-bars mounted on said slide bars, of means connected with said counter-shaft for operating said slide bars, a sector gear pivoted on said slide bars, a rack bar meshing with said sector gear, a segmental gear mounted on said counter-shaft and adapted to engage said rack-bar, and operative connection between said sector gear and the rock-bars.

2. In a rod bending machine, the combination with a frame, a drive-shaft, a countershaft, and means for intermittently connecting the countershaft with the drive-shaft, of rod bending means, comprising slide-bars adapted to move transversely to the frame, rock-bars carried by said slide-bars, means for operating said rock bars, toggle levers operatively connected to said slide bars, a slide frame supported on said counter-shaft, an adjustable connection between said slide frame and the toggle levers, cams on said counter-shaft adapted to operate said slide frame, rock arms on said frame and means for operating said rock arms.

3. In a rod bending machine, the combination with a frame, a drive-shaft, a counter-shaft, means for intermittently operating the counter-shaft, a rock-shaft, operative means connecting the said counter-shaft and the rock-shaft, rock-arms adapted to bend the ends of the rod to be formed upward, operative connection between said rock-arms and the rock-shaft, slide bars adapted to move transversely to the said frame, and toggle-jointed levers attached to said slide-bars, of a slide frame adjustably connected with said toggle-jointed levers, bearings for said slide frame mounted on said counter-shaft, cams on the counter-shaft adapted to engage said slide-frame, rock-bars carried by said slide-bars, and hingedly connected thereto, a sector gear rockably mounted on said slide-bars, a rack bar engaging said gear, and a segmental gear mounted on said counter-shaft and adapted to engage said rack-bar.

4. In a rod bending machine, the combination of a frame, a drive shaft, a counter-shaft, means for intermittently rotating the said counter-shaft, a rock-shaft, rod bending mechanism operatively connected with said counter-shaft and rock-shaft, said mechanism including slide-plates, rock-bars mounted on said slide-plates, hinges connecting the said rock-bars and slide-plates, adjustable pintles for some of the hinges, said pintles having projecting ends formed eccentric to the axis of the body of the pintle, and set screws for securing the pintles in adjusted position.

5. In a link forming machine, the combination with a frame, a drive-shaft, a counter-shaft, a clutch adapted to connect the said shafts, manually operated means for engaging the clutch members, means for automatically disengaging the clutch at each revolution of said counter-shaft, rod bending mechanism comprising slide-plates, rock-bars mounted on said plates, rock-arms pivoted on said frame, means connected with said counter-shaft for operating the said plates and bars, a rock-shaft, levers mounted on said rock-shaft and adapted to operate said rock-arms, and cams on said counter-shaft adapted to operatively engage said levers, of means for adjusting the throw of said levers.

6. In a link forming machine, the combination of a frame, a drive shaft, a counter-shaft, means for intermittently rotating the said counter-shaft, a rock-shaft, rod bending mechanism including rock-arms, slide-plates, rock-bars mounted on said plates, hinges connecting the said plates and bars, adjustable pintles for some of the hinges, said pintles having projecting ends adapted to engage the rod to be bent, said ends being formed eccentric to the axis of the body of the pintle, set screws for the pintle, levers on said rock-shaft adapted to operate said rock-arms, cams on said counter-shaft adapted to operatively engage the said levers, and means for adjusting the throw of the levers.

7. In a link forming machine, the combination with a frame and a drive shaft mounted thereon, of rod bending means comprising slide plates adapted to be moved toward and away from each other, rock bars mounted on said plates, hinges for said bars, adjustable pintles for some of the hinges, eccentric projections on said pintles adapted to be engaged by the ends of the rod to be bent, and operative connection between said rod bending means and the drive shaft.

8. In a link forming machine, the combination with a frame, a drive shaft, a counter-shaft, a clutch adapted to connect said shafts, a rock-shaft, rod-bending mechanism including rock-arms adapted to upwardly bend the ends of the rod to be formed, slide-plates adapted to be moved transversely to said frame, and toggle-jointed levers pivoted to said plates, of a slide-frame, bearings for said slide frame mounted on said counter-shaft, cams on said counter-shaft adapted to move said slide frame in one direction, a spring adapted to move the slide-frame in the opposite direction, an adjustable connection between the slide-frame and said levers, rock-bars mounted on said plates, hinges connecting the said plates and rock-bars, adjustable pintles for some of said hinges, a sector gear mounted on a pintle common to the other hinges, operative connection between said gear and the rock-bars, a rack-bar engaging said gear, a segmental gear mounted on said counter-shaft and engaging said rack-bar, and adjustable means for operating said rock-arms.

In testimony whereof I affix my signature in the presence of two witnesses.

EMMET McCARTHY.

Witnesses:
H. DELOS HIGMAN,
M. A. MILORD.

Copies of this patent may be obtained for five cents each, by addressing the "Commissioner of Patents, Washington, D. C."